ic Office 2,842,476
Patented July 8, 1958

2,842,476

INSECTICIDAL COMPOSITIONS

Albert A. Schreiber, Salem, N. Y., assignor to McLaughlin Gormley King Company, Minneapolis, Minn., a corporation of Minnesota No Drawing. Application April 23, 1953
Serial No. 350,759

11 Claims. (Cl. 167—24)

This invention relates to insecticides and it has particular relation to new and improved insecticidal compositions comprising, in addition to known toxicants, other ingredients, which form novel combinations of valuable properties.

In view of the rather high costs of natural pyrethrum and pyrethrum extracts and the somewhat lower, but still considerable costs of the synthetic product known under the name allethrin (allyl homologue of cinerin I) or its homologues, substances called "synergist" have been used for some time in combination with the "pyrethroids." These synergists of widely varying chemical structures and sometimes offensive odor, which possess normally some paralyzing and lethal effect of their own, show, when combined with pyrethroids and/or other organic toxicants, a biological effect which is greater than the sum of biological effects of the individual components of such combinations. They have been added, therefore, in multiple quantities to natural and/or synthetic pyrethroids and other toxicants, in order to produce insecticidal compositions of lower cost, but of about equal biological effect in comparison with said pyrethroids and toxicants without the addition of synergists. Since the value of pyrethroids, which are still the insecticides least harmful to mammals, exists mainly in the paralyzing effect of small doses, the effect desired from addition of a synergist is mainly an increased lethality without substantial increase in the toxicity to mammals.

Other organic toxicants with high lethality, such as the well-known halogenated, and particularly chlorinated, products, e. g. the di-aryl trichloroethane derivatives, such as bis (methoxy phenyl) trichloroethane, DDT and its modifications, and nuclear halogenated compounds, such as benzene hexachloride and chlordane, or mixtures thereof, are deficient in the desired quick paralyzation. By combining pyrethroids with said halogenated products, both, quick paralyzation and high lethality, have been achieved, but these combinations, without or even with the further addition of synergists, are still rather expensive and rather toxic to mammals.

Hydrocarbon toxicants, such as mono- and poly-alkyl, especially methyl, naphthalenes and mixtures thereof, can be considered as standing between said groups of pyrethroids and of halogenated products.

It has to be remembered, however, that said trichloroethane derivatives differ biologically from said nuclear halogenated products by the possible cleavage of hydrochloric acid from the trichloro ethyl radicals and are thus liable to acquire the nature of an inorganic toxicant. This property can be overcome, however, for the purposes of the present invention by the addition of a strictly organic toxicant, such as the said hydrocarbon toxicants.

I have now found a group of inexpensive compounds possessing a hitherto unknown type of paralyzing effect and a very substantial synergistic lethal effect, though practically no lethal effect of their own, and a very low toxicity to mammals. Said paralyzing effect is almost instantaneous upon contact, but gradually decreases, in contrast to the gradually increasing paralyzation by pyrethroids or combinations thereof with known synergists. This spectacular behavior of the compounds in question allows of obtaining substantially higher insecticidal effects, since an early high paralyzation leads to substantially higher total mortality. Generally, the presence of said compounds in combinations according to the present invention, increases paralysis by toxicants deficient in paralysis and increases the lethal effect of toxicants which are deficient in the latter.

The compounds used in combinations embodying the present invention, are oil-soluble salts of organic sulfonic acids, especially alkyl aromatic sulfonic acids, with lower nitrogen bases. The term "oil-soluble" is used to denote solubility in such mineral oil fractions as are commonly used for dissolving and/or diluting insecticides. Such mineral oil fractions contain, as a rule, only very minor proportions, if any, of aromatic and cyclic constituents and are available as various brands of more or less deodorized kerosene. The degree of solubility required is governed mostly by the contemplated use of the salts and the concentrations desired for finished insecticides, or for higher concentrated products for the manufacture of the former. In the latter case, products of higher solubility will be chosen than is required in the manufacture of diluted solutions. Generally, the salts of sulfonic acids with longer or more alkyl groups, show higher solubility, or even complete miscibility, with said mineral oil fractions.

Organic sulfonic acids can be obtained, broadly speaking, by sulfonating higher aliphatic olefinic compounds by adding sulfuric anhydride to a double linkage, or sulfonating aromatic compounds with the aid of sulfuric acid, with or without the aid of sulfuric anhydride. Sodium salts of said sulfonic acids, especially those of alkyl aromatic sulfonic acids, have been known and used as wetting and emulsifying agents and have been produced by sulfonation of alkyl benzenes or alkyl naphthalenes, obtainable for instance by Friedel-Crafts or vapor phase condensation, or by simultaneous alkylation and sulfonation with the aid of alkanols. In order to obtain salts of satisfactory oil-solubility, the single or multiple alkyl radicals of the aromatic nuclei should, at least jointly, contain at least 4, preferably 8–30, carbon atoms, products with single longer chains being preferred over products with multiple shorter chains. It is not necessary that a certain sulfonic acid product consist exclusively of one individual compound, and such product can consist of a mixture of sulfonic acids having alkyl groups of different lengths. Such mixtures can be prepared from less refined raw materials without impairing their effectiveness for the purposes of the present invention.

Thus, for example, a sulfonic acid mixture can be used, which contains an average of 10, 12 or 16 carbon atoms in alkyl chains of benzene or naphthalene, but in which the number of carbon atoms in the individual alkyl chains can vary by 4 to 6 carbon atoms below and above the said figures. Accordingly, the sulfonic acids, often called mahogany acids, obtained in refining petroleum white oils, can be used in carrying out my invention.

In the compositions embodying the invention, said sulfonic acids are used in the form of their salts with lower nitrogen bases. Such nitrogen bases are ammonia and its alkylation products, such as the mono- and poly-methyl, ethyl, propyl, butyl, amyl and hexyl amines and alkylene amines, such as pyrrolidines and piperidines. Since salts from amines containing further substituents, such as hydroxy or halogen substituents, are less soluble and more expensive than those from ammonia or unsubstituted lower alkyl amines, the latter are preferred. Substitution in the benzene or naphthalene nuclei, e. g. by hydroxy or halogen substituents, does not seem to materially increase the insecticidal effect of the relative salts and tends to reduce the solubility of the latter.

Said salts can be prepared directly by reacting the free sulfonic acids with one nitrogen base, or a mixture of nitrogen bases, if desired in the presence of a solvent or coolant, such as gasoline, or higher fractions of mineral or coal tar oils, with subsequent evaporation of any water present and of the solvent or coolant, if absence of the latter in the final product is preferred. Or commercially available sodium salts are decomposed e. g. with sulfuric acid, the resulting free sulfonic acids are separated in any convenient manner, and finally reacted with the desired nitrogen base or bases. Depending on the components of the salts, the latter are viscous, honey-like liquids at room temperature or solids melting on moderate warming.

The sulfonic acid salts should be used in an amount of at least about 0.2% by weight of the final insecticidal preparations. In those cases, in which the final preparation does not contain another agent having a pronounced paralyzing effect, or a small proportion of such agent only, the amount of the sulfonic acid salt is preferably raised to 2.0–3.0% by weight of the final preparation.

The combinations of the sulfonic acid salts with various organic toxicants, especially those which are also soluble in said mineral oil fractions, are used in the form of homogeneous solutions, such as sprays, or aerosols. In general it is preferred to prepare the combinations of the sulfonic acid salts with the organic toxicants in the form of clear solutions in mineral oil fractions, which have the desired concentration and are free from any substantial quantity of water, beyond that occasionally occurring in the other toxicant components, and, therefore, may be called anhydrous.

It has been found that mineral oil solutions of sulfonic acid salts used according to my invention do not show lower viscosity and lower surface tension than the respective oils themselves, but slightly higher values in most cases. Consequently, it can be assumed that the effect of said sulfonic acid salts is not due to physical, but to physiological phenomena.

While the nature of the nitrogen base in the sulfonic acid salts used in the compositions of the present invention is rather immaterial, with regard to the biological effect on flying insects, a quicker and higher effect on crawling insects is, in general, obtained with salts from alkylamines containing alkyl groups with at least 3 carbon atoms, preferably 3 to 5 carbon atoms, in the form of a branched chain. For example, while in combinations with allethrin the lethality of the latter, for instance on roaches, can be doubled by the addition of an ammonium salt, it can be increased to 6 or 7 times that of allethrin alone, by the addition of a salt of an amine, such as propyl, butyl or amyl amine. Therefore, specific salts can be easily chosen in accordance with the intended use of the final preparations.

In testing the preparations according to the invention outdoors under various conditions, it has been found that their effect is much less affected by low humidity and high temperatures than that of preparations made from equivalent toxicants under equal conditions, but in the absence of sulfonic acid salts used according to the invention. Therefore, very satisfactory results are obtained with the compositions of the invention even in arid regions.

The following specific examples serve to illustrate the nature of this invention, without limiting the latter thereto.

EXAMPLES I–XXI

| No. of Example | Toxicant, Milligrams | | Sulfonic acid salt | Milligrams |
|---|---|---|---|---|
| I | pyrethrins | 100 | iso-propylamine salt of dodecyl benzene monosulfonic acid. | 500 |
| II | allethrin | 100 | ammonium salt of dodecyl benzene monosulfonic acid. | 500 |
| III | do | 100 | dimethylamine salt of dodecyl benzene monosulfonic acid. | 500 |
| IV | do | 100 | trimethylamine salt of dodecyl benzene monosulfonic acid. | 500 |
| V | do | 100 | ethylamine salt of dodecyl benzene monosulfonic acid. | 500 |
| VI | do | 100 | allylamine salt of dodecyl benzene monosulfonic acid. | 500 |
| VII | do | 100 | iso-propylamine salt of dodecyl benzene monosulfonic acid. | 500 |
| VIII | do | 100 | iso-butylamine salt of dodecyl benzene monosulfonic acid. | 500 |
| IX | do | 100 | iso-amylamine salt of dodecyl benzene monosulfonic acid. | 500 |
| X | do | 100 | n-hexylamine salt of dodecyl benzene monosulfonic acid. | 500 |
| XI | do | 100 | 2-ethylhexylamine salt of dodecyl benzene monosulfonic acid. | 500 |
| XII | do | 100 | choline salt of dodecyl benzene monosulfonic acid. | 400 |
| XIII | do | 100 | pyrrolidine salt of dodecyl benzene monosulfonic acid. | 400 |
| XIV | do | 100 | piperidine salt of dodecyl benzene monosulfonic acid. | 500 |
| XV | do | 100 | ammonium salt of a mixture of $C_{22}$–$C_{28}$ alkyl benzene monosulfonic acid. | 500 |
| XVI | do | 100 | iso-propylamine salt of a mixture of alkyl aryl sulfonic acids from the refining of white oil (mahogany acid). | 500 |
| XVII | do | 100 | ammonium salt of di-iso-propyl naphthalene monosulfonic acid. | 500 |
| XVIII | do | 100 | iso-propylamine salt of oleic ester of isethionic acid. | 500 |
| XIX | do | 100 | ammonium salt of dioctyl-ester of sulfosuccinic acid. | 500 |
| XX | DDT / methylated naphthalenes. | 1,000 / 8,000 | iso-propylamine salt of dodecyl benzene monosulfonic acid. | 2,000 |
| XXI | allethrin / methylated naphthalenes. | 50 / 4,000 | do | 500 |

The amounts of toxicants and sulfonic acid salts stated in each of the above Examples I to XXI were dissolved in such amount of deodorized kerosene that 100 mls. of the solution was obtained in each case, thus forming solutions denoted I–XXI hereinafter.

Furthermore, solutions were prepared by dissolving in the beforementioned deodorized kerosene the following substances, to a solution of 100 mls. in each case:

Milligrams
(a) Pyrethrins _____ 50
(b) Pyrethrins (OTI) _____ 100
(c) Allethrin _____ 50
(d) Allethrin _____ 100
(e) Methylated naphthalenes _____ 4000
(f) Iso-propylamine salt of dodecyl benzene monosulfonic acid _____ 500
(g) Ammonium salt of a mixture of $C_{22}$–$C_{28}$ alkyl benzene sulfonic acids _____ 500

The above described solutions I–XXI and (a)–(g) were tested with regard to their effect on flies according to the standard Peet Grady method on large groups of flies as described in Soap, Blue Book, 1952, p. 255. The results are shown in the following "Table I."

Table I

| Solution | Percent paralysis in— | | | Percent mortality in 24 hours | Above or below individual O.T.I. |
|---|---|---|---|---|---|
| | 3' | 5' | 10' | | |
| (a) | 94 | 95 | 96 | 22 | −14 |
| (b) | 98 | 99 | 99 | 35–45 | 0 |
| (c) | 94 | 95 | 97 | 30 | −10 |
| (d) | 96 | 98 | 99 | 50 | +10 |
| (e) | 65 | 66 | 68 | 21 | −19 |
| (f) | 66 | 65 | 50 | 8 | −34 |
| (g) | 67 | 58 | 42 | 3 | −38 |
| I | 99 | 99 | 99 | 65 | +16 |
| II | 97 | 98 | 99 | 86 | +42 |
| III | 96 | 97 | 99 | 79 | +35 |
| IV | 97 | 98 | 99 | 85 | +42 |
| V | 98 | 99 | 99 | 86 | +41 |
| VI | 96 | 97 | 100 | 82 | +41 |
| VII | 98 | 99 | 100 | 84 | +36 |
| VIII | 97 | 98 | 99 | 75 | +32 |
| IX | 97 | 98 | 100 | 72 | +29 |
| X | 97 | 98 | 99 | 89 | +40 |
| XI | 96 | 97 | 99 | 72 | +34 |
| XII | 94 | 96 | 99 | 71 | +31 |
| XIII | 97 | 98 | 99 | 91 | +50 |
| XIV | 98 | 98 | 99 | 84 | +37 |
| XV | 99 | 99 | 99 | 76 | +35 |
| XVI | 96 | 98 | 99 | 73 | +31 |
| XVII | 97 | 97 | 99 | 71 | +33 |
| XVIII | 96 | 97 | 99 | 76 | +34 |
| XIX | 98 | 99 | 100 | 78 | +42 |
| XX | 96 | 97 | 100 | 99 | +58 |
| XXI | 97 | 98 | 99 | 91 | +55 |

EXAMPLE XXII 100 milligrams of allethrin, 4300 milligrams of methylated naphthalenes and 500 milligrams of the iso-propylamine salt of dodecyl benzene monosulfonic acid, are dissolved in deodorized kerosene to a solution of 100 mls.

EXAMPLE XXIII 300 milligrams of chlordane and 500 milligrams of the iso-propylamine salt of dodecyl benzene monosulfonic acid are dissolved in deodorized kerosene to a solution of 100 mls.

The solutions prepared according to Examples XXII and XXIII are denoted solutions XXII and XXIII hereinafter.

The effect of compositions according to my invention, on German male roaches, was tested by the tentative method of C. S. M. A., as described in Soap, vol. 22, p. 145 (1946), using the above described solutions I, VII, VIII, IX, XII, XIII, XIV, XV, XX, XXI, XXII, XXIII, (b), (c), (d), (e), (f), (g), as well as the following solutions:

Solution (h).—43000 milligrams of methylated naphthalenes dissolved in deodorized kerosene to 100 mls. solution;

Solution (i).—300 milligrams of chlordane dissolved in deodorized kerosene to 100 mls. solution.

The results of the tests are shown in the following Table II.

Table II

| Solution | Ml. Dosage | Percent Mortality | | above or below individual O.T.I. |
|---|---|---|---|---|
| | | 24 hrs. | 48 hrs. | |
| (b) | 0.4 | 78 | 83–85 | |
| (d) | 0.4 | 5 | 16 | −70 |
| (c) | 0.4 | 4 | 13 | −73 |
| (f) | 0.4 | 0 | 0 | −85 |
| (g) | 0.5 | 0 | 0 | −83 |
| (e) | 0.4 | 0 | 0 | −85 |
| (h) | 0.4 | 5 | 8 | −77 |
| (i) | 0.4 | 37 | 77 | |
| I | 0.4 | 88 | 91 | +6 |
| VII | 0.4 | 66 | 86 | −2 |
| VIII | 0.4 | 45 | 82 | −13 |
| XII | 0.4 | 31 | 57 | −30 |
| IX | 0.4 | 69 | 95 | +10 |
| XIII | 0.4 | 51 | 69 | −22 |
| XIV | 0.4 | 39 | 62 | −30 |
| XV | 0.4 | 42 | 64 | −19 |
| XXI | 0.4 | 40 | 68 | −13 |
| XXII | 0.4 | 80 | 82 | −1 |
| XX | 0.4 | 80 | 95 | +10 |
| XXIII | 0.4 | 65 | 98 | +21 |

The possibility of replacing large amounts of pyrethrins in aerosols by combining allethrin with one of the salts used according to the present invention is shown by the following tests, which were carried out by the C. S. M. A. Aerosol Test Method as described in Soap, Blue Book, 1952, p. 251, against the standard T. O. T. A. as indicated.

Table III

| | Pyrethrins | Allethrin | piperonyl butoxide | DDT | Sovacide | iso-propylamine salt of dodecyl benzene mono-sulfonic acid | Paralysis, Percent | | | Mortality, percent 24 hrs. |
|---|---|---|---|---|---|---|---|---|---|---|
| | | | | | | | 5' | 10' | 15' | |
| | Percent of Total | | | | | | | | | |
| (1) TOTA | 0.2 | | 0.5 | 2.0 | 5.0 | | 33 | 47 | 59 | 73.0 |
| | 0.4 | | | 2.0 | | | 29 | 41 | 52 | 82.3 |
| (2) TOTA | | 0.2 | | 2.0 | 5.0 | 1.0 | 29 | 45 | 58 | 81.5 |
| | 0.4 | | | 2.0 | | | 23 | 35 | 41 | 68.0 |
| (3) TOTA | | 0.2 | | 2.0 | 7.2 | 2.0 | 23 | 36 | 41 | 74.0 |
| | 0.4 | | | 2.0 | | | 23 | 35 | 41 | 68.0 |

The above concentrations denote the percentages of active ingredients in the finished aerosol spray consisting of 42.5% each of Freon 11 and Freon 12 and 15% of concentrate in which latter the balance of the active ingredients stated and the said percentage of 15% consists of deodorized kerosene.

EXAMPLE XXIV

An area in the neighborhood of hog pens in Arizona was regularly sprayed with the aid of a fogging machine with a spray containing 0.2% by weight (0.25% W/v, i. e. 0.25 grams per 100 mls.) of pyrethrins, and the effect was checked with the aid of (electrocuting) fly traps giving the number of surviving flies. In order to reduce the cost of this treatment the area was sprayed first with DDT and, after the flies became resistant to sprays containing up to 10% DDT, with 10% chlordane, 5% lindane and 3% parathion. In each case the reduction in the fly population could not be increased beyond 70% in comparison to the original reduction of about 92%. The area was then sprayed by the same machine with a spray consisting of 0.26% (W/v, i. e. 0.26 grams per 100 mls.) of allethrin, 1.3% of the ethylhexyl di-keto pyrrolidine according to U. S. Patent No. 2,476,512 and 1.3% of the iso-propylamine salt of dodecyl benzene mono-sulfonic acid in deodorized kerosene, whereby the reduction in the fly population reverted to 94 and 95% without noticeable decrease within 5 months.

EXAMPLE XXV 1000 milligrams of bis(p-methoxyphenyl) trichloroethane (methoxychlor), 8000 milligrams of methylated naphthalenes and 2000 milligrams of the iso-propylamine salt of dodecyl benzene monosulfonic acid, are dissolved in deodorized kerosene to a solution of 100 mls.

When tested in the manner stated above in connection with Table I, the percent paralysis in 3', 5' and 10', was found to be 99, 100, 100, respectively; the percent mortality in 24 hours was found to be 100, 64 above individual O. T. I.

When tested in the manner described above in connection with Table II, dosage 0.4 ml., the percent mortality in 24 hours as well as in 48 hours, was found to be 100, 15 above individual O. T. I.

In the present specification and claims, the term "allethrin" denotes the synthetic analog of Cinerin I, i. e. d,1-2-allyl-4-hydroxy-3-methyl-2-cyclopentene - 1 - one esterified with a mixture of cis- and trans-chrysanthemum monocarboxylic acids, quantities stated corresponding to 100% of the said esters from commercial 90% material as analyzed by hdrogenolysis or other suitable method.

The term "methylated naphthalenes" denotes commercial mixtures of mono-, di- and trimethyl naphthalenes, with a preponderating percentage of dimethyl naphthalenes, of which Sovacide (PD544C) is a commercial brand.

The term "piperonyl butoxide" denotes the commercial product consisting mainly of alpha-(2-(2-butoxyethoxy)-ethoxy)-4,5-methylenedioxy-2-propyl-toluene.

The terms mahogany acid and mahogany sulfonates denote the mixture of sulfonic acids, also called petroleum sulfonates, occurring as byproducts in the removal of unsaturated hydrocarbons from petroleum fractions with the aid of strong sulphuric acid, as for example in the production of white oils.

The terms O. T. I. and T. O. T. A. stand for "Official Test Insecticide" and "Tentative Official Test Aerosol" and the standards obtained therewith, "Soap, Blue Book" being published as "Soap and Sanitary Chemicals, Blue Book and Catalog Edition," by the MacNair-Dorland Company, New York.

The term organic toxicant is used herein to denote and include organic toxicants of the type of the pyrethroids, as exemplified by pyrethrins and allethrin, aromatic toxicants such as alkylated, especially methylated, naphthalenes, nuclear polychlorinated cyclic compounds, such as benzene hexachloride, polychloro endomethylene hydronaphthalenes and cyclopentadienes, such as chlordane, as well as the combinations of aromatic toxicants, such as the methylated naphthalenes, with di-phenyl trichloro ethane compounds, such as DDT and methoxychlor (1,1,-1-trichloro-2,2-bis (p-methoxyphenyl) ethane) which latter, owing to the possible cleavage of hydrochloric acid from the aliphatic radical and apparent different biological effect, are liable to be considered as inorganic toxicants in contrast to the said nuclear polychlorinated compounds. The said different effect can be overcome, however, in the said combination with a strictly organic toxicant.

It will be understood from the above description, examples and explanations that my invention is not limited to the specific, individual materials, proportions and other specific details specifically described above and can be carried out with various modifications in commercial practice. For example, commercially available sulfonic acids, such as dodecyl benzene sulfonic acid may be replaced by decyl or hexadecyl benzene sulfonic acids and di-isopropyl naphthalene sulfonic by di-butyl naphthalene sulfonic acid or the corresponding sulfonic acids obtainable from benzene or naphthalene with the aid of di-amylene and fuming sulphuric acid, or by alkyl tetrahydronaphthalene sulfonic acids. Similarly, the oleic ester of isethionic acid may be replaced by the lauric ester and the corresponding esters of methylol sulfonic acid. The di-octyl ester of sulfosuccinic acid may be replaced by the corresponding di- butyl, -amyl or hexyl esters, and sulfonic acids may be used as are obtained by the sulfonation of olefines containing from 8–16, preferably at least 12, carbon atoms with aceto sulphuric acid, chlorosulphonic acid, fuming sulphuric acid in an inert solvent, or addition compounds of sulphuric anhydride and ethers. If convenient the salts used according to the present invention can be prepared from mixtures of the different sulphonic acids, and also mixtures of the different bases can be used while taking care that approximately accurate neutralization is obtained, so that the resulting products are practically neutral or show, in water, only very little alkalinity or acidity from their production or owing to differing ionization constants of the components. In most cases, the salts of the rather volatile, lower nitrogen bases will be preferred for commercial use.

The term "DDT" is used in the present application to denote the compound 1,1,1-trichloro-2,2-bis (p-chlorophenyl)ethane and the term "chlordane" is used to denote the compound 1,2,4,5,6,7,8,8-octachloro-2,3,3a,4,7,7a-hexahydro-4,7-methanoindene. The term "allethrin" is the common name given by the Interdepartmental Committee on Pest Control to a synthetic ester, the dl 2-allyl-4-hydroxy-3-methyl-2-cyclopenten-1-one ester of the mixture of cis and trans dl-chrystanthemum carboxylic acid, and is used in the present application to denote said compound.

What is claimed is:

1. Anhydrous insecticidal composition comprising, dissolved in a kerosene type mineral oil fraction, a pyrethroid and from about 2 to 10 times its weight of a nitrogen base salt, selected from the group consisting of —$NH_4$ and amines containing up to 8 carbon atoms, of an alkyl aryl monosulfonic acid, whose alkyl groups contain 6–30 carbon atoms and whose aryl groups are selected from the group consisting of benzene and naphthalene.

2. Anhydrous insecticidal composition comprising, dissolved in a kerosene type mineral oil fraction, a pyrethroid and from about 2 to 10 times its weight of a nitrogen base salt, selected from the group consisting of —$NH_4$ and amines containing up to 8 carbon atoms, of an alkyl benzene monosulfonic acid, whose alkyl groups contain 8–28 carbon atoms.

3. Anhydrous insecticidal composition comprising, dissolved in a kerosene type mineral oil fraction, a pyrethroid and from about 2 to 10 times its weight of a nitrogen base salt, selected from the group consisting of —$NH_4$ and amines containing up to 8 carbon atoms, of an alkyl benzene monosulfonic acid, whose alkyl groups contain 8–12 carbon atoms.

4. Anhydrous insecticidal composition comprising, dissolved in a kerosene type mineral oil fraction, a pyrethroid and from about 2 to 10 times its weight of an alkylamine salt, containing in said alkylamine up to 8 carbon atoms, of an alkyl benzene monosulfonic acid, whose alkyl groups contain 8–12 carbon atoms.

5. Anhydrous insecticidal composition comprising, dissolved in a kerosene type mineral oil fraction, pyrethrins and from about 2 to 10 times their weight of an alkylamine salt, containing in said alkylamine up to 8 carbon atoms, of an alkyl benzene monosulfonic acid, whose alkyl groups contain 8–12 carbon atoms.

6. Anhydrous insecticidal composition comprising, dissolved in a kerosene type mineral oil fraction, allethrin and from about 2–10 times its weight of a nitrogen base salt, selected from the group consisting of —$NH_4$ and amines containing up to 8 carbon atoms, of any alkyl benzene monosulfonic acid, whose alkyl groups contain 8–28 carbon atoms.

7. Anhydrous insecticidal composition comprising, dissolved in a kerosene type mineral oil fraction, allethrin and from about 2–10 times its weight of an alkylamine salt, said alkylamine containing 2–6 carbon atoms, of an alkyl benzene monosulfonic acid, whose alkyl groups contain 8–12 carbon atoms.

8. Anhydrous insecticidal composition comprising, dissolved in a kerosene type mineral oil fraction, allethrin and from about 2–10 times its weight of an alkylamine salt, said alkylamine containing 3 carbon atoms, of an alkyl benzene monosulfonic acid, whose alkyl groups contain 8–12 carbon atoms.

9. Anhydrous insecticidal composition comprising, dissolved in a kerosene type mineral oil fraction, allethrin and from about 2–10 times its weight of the isopropylamine salt of an alkyl benzene monosulfonic acid, whose alkyl groups contain 8–12 carbon atoms.

10. Anhydrous insecticidal composition comprising, dissolved in a kerosene type mineral oil fraction, allethrin and from about 2–10 times it weight of the isopropylamine salt of dodecyl benzene monosulfonic acid.

11. Anhydrous insecticidal composition comprising, dissolved in a kerosene type mineral oil fraction, allethrin and from about 2–10 times it weight of a propylamine salt of a mahogany acid.

References Cited in the file of this patent

UNITED STATES PATENTS

| | | |
|---|---|---|
| 2,205,950 | Flett | June 25, 1940 |
| 2,247,365 | Flett | July 1, 1941 |
| 2,283,199 | Flett | May 19, 1942 |
| 2,538,724 | Hass et al. | Jan. 16, 1951 |
| 2,607,796 | Schecter et al. | Aug. 19, 1952 |
| 2,696,453 | Sanders | Dec. 7, 1954 |
| 2,731,338 | Fike | Jan. 17, 1956 |

FOREIGN PATENTS

| | | |
|---|---|---|
| 463,544 | Great Britain | Mar. 30, 1937 |

OTHER REFERENCES

Campbell et al.: J. of Econ. Entom., December 1934, pp. 1176–1185.

Brown: A. W. A., Insect Control by Chemicals, 1951, pp. 26, 115–117, 486, and 694.

Brown: A. W. A., Insect Control by Chem., 1951, pp. 207–209.